July 19, 1949.  A. THOMAS  2,476,466
MECHANISM FOR DRIVING OSCILLATORY MEMBERS
Filed Aug. 8, 1947  2 Sheets-Sheet 1

INVENTOR
ARTHUR THOMAS
BY *J. L. Sterling*
ATTORNEY

July 19, 1949.　　　　　A. THOMAS　　　　　2,476,466
MECHANISM FOR DRIVING OSCILLATORY MEMBERS
Filed Aug. 8, 1947　　　　　　　　　　　　2 Sheets-Sheet 2

INVENTOR
ARTHUR THOMAS
BY *J. L. Sterling*
ATTORNEY

Patented July 19, 1949

2,476,466

UNITED STATES PATENT OFFICE 2,476,466

MECHANISM FOR DRIVING OSCILLATORY MEMBERS

Arthur Thomas, Wallington, England, assignor to Powers-Samas Accounting Machines Limited, London, England, a British company Application August 8, 1947, Serial No. 767,464
In Great Britain August 14, 1946

3 Claims. (Cl. 74—42)

This invention relates to mechanism for driving an oscillatory member.

Such members are normally driven by cam mechanism or alternatively by crank mechanisms. However, cam mechanisms are not convenient for some purposes and the usual type of crank mechanism is such that while it provides a smooth change over at each end of its stroke the speed of travel does not remain constant but increases considerably at the centre of its movement. Thus, the usual types of crank mechanism employed for driving an oscillatory member are not suitable when for some specific purpose it is desired that the speed of travel of the oscillatory member be relatively constant.

An example of the need for an oscillatory member having a relatively constant speed is to be found in the apparatus described in co-pending U. S. patent application S. N. 700,711 in which an oscillating member moves a pawl past a succession of stop pins. For operational considerations it is required that the pawl be moved at a relatively constant speed past these stop pins. Also, in such an apparatus the limiting speed at which the apparatus can operate is the speed at the fastest point and any reduction in this maximum speed will permit a corresponding increase in the operating speed to be obtained.

It is an object of the present invention to provide a driving mechanism for an oscillatory member whereby the speed of movement of the member is relatively constant during its operative stroke.

A further object of the invention is to provide mechanism capable of driving an oscillatory member at a relatively high speed, such speed being of the order of 400 oscillations per minute.

According to the invention there is provided mechanism for driving an oscillatory member, comprising a rotatable driven shaft, a driving member mounted on the shaft for rotation therewith, a slide carried by the driving member for radial movement relative thereto, an eccentric element co-axial with the rotatable shaft and connected with said slide, means to rotate said rotatable shaft and eccentric element in opposite directions at equal angular velocities, and means to connect the slide with the oscillatory member.

Further, according to the invention there is provided mechanism for driving an oscillatory member, comprising in combination a rotatable driving shaft, a driven shaft rotated by the driving shaft at an equal angular velocity, a crank disc secured to the driven shaft for rotation therewith, two sliding elements slidably mounted in diametrically opposite slots in said crank disc, a connecting element connecting the sliding elements and movable therewith, an eccentric element co-axial with said driven shaft, a connecting rod connecting the eccentric element with said sliding elements, gearing driven from the driving shaft to rotate said eccentric element in a direction opposite that of the driving shaft but at the same angular velocity, and means to connect said connecting element with a member to be oscillated.

In order that the invention may be clearly understood one embodiment thereof will now be described, by way of example, with reference to the accompanying drawings in which.

In the drawings like references refer to like parts.

Figure 1:
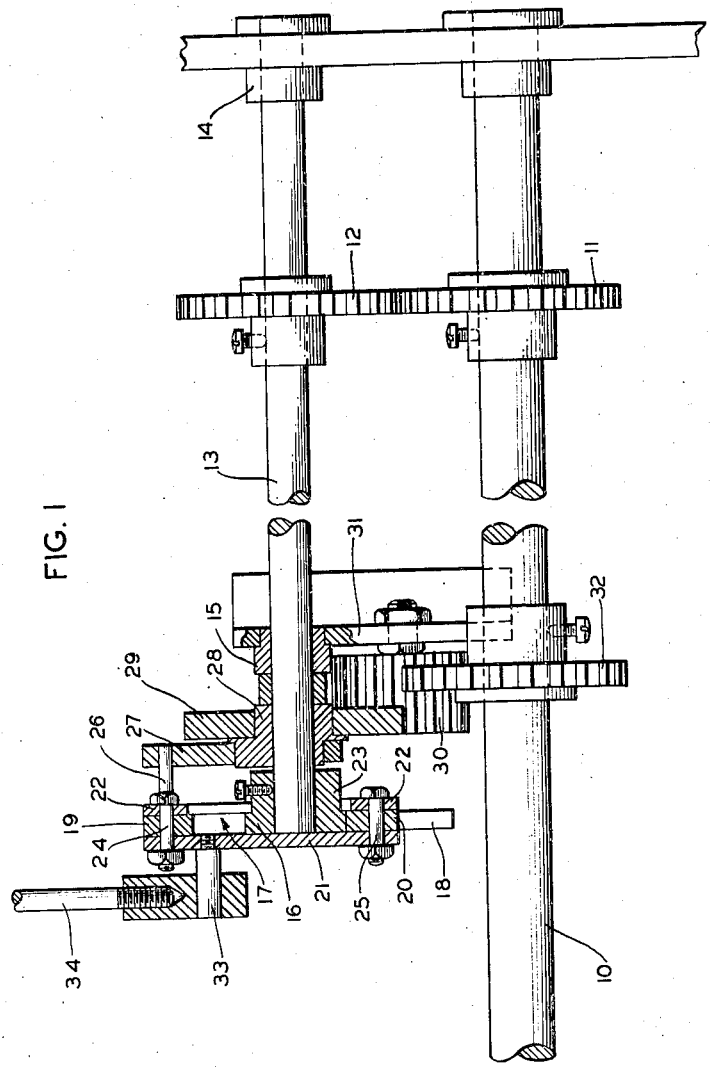
Figure 1 is a side elevation partly in section.

Referring to the drawings: a rotatable driving shaft 10 is driven from the main drive, not shown, of the machine to which the mechanism is fitted. The shaft has a gear wheel 11 secured to it, and this wheel meshes with a gear wheel 12 secured to a driven shaft 13 mounted for rotation in bearings 14 and 15. The gears 11 and 12 have a 1:1 ratio so that the shafts 10 and 13 are rotated at equal angular velocities.

A driving member consisting of a crank disc 16 is secured to the free end of the shaft 13 for rotation therewith. The crank disc 16 is provided with two opposite slots 17 and 18 each housing a sliding element consisting of slide blocks 19 and 20. On opposite sides of the crank disc 16 is located a connecting element in the form of a strap 21 and a plate 22. The plate 22 is slotted to pass over the boss 23 of the crank disc 16. The members 21 and 22 and the slide blocks 19 and 20 are secured together by bolts 24 and 25, the arrangement being such that the blocks and members are movable radially relatively to the crank disc.

The bolt 24 has an extension pin 26, the outer end of which is housed in an arm 27 mounted for rotation on an eccentric 28 freely mounted on the driven shaft 13. A gear wheel 29 fixed to the eccentric is geared through an idler 30, mounted on a bracket 31, with a gear wheel 32 fixed to the driving shaft 10. The gear ratio of the wheels 11, 12, 29 and 32 is 1:1 so that the driven shaft 13 and the eccentric 28 rotate at the same angular velocity. Due, however, to the interposition of the idler 30 between the wheels 29 and 32 the eccentric 28 rotates in the opposite direction to the direction of rotation of the driven shaft 10.

Figure 2:
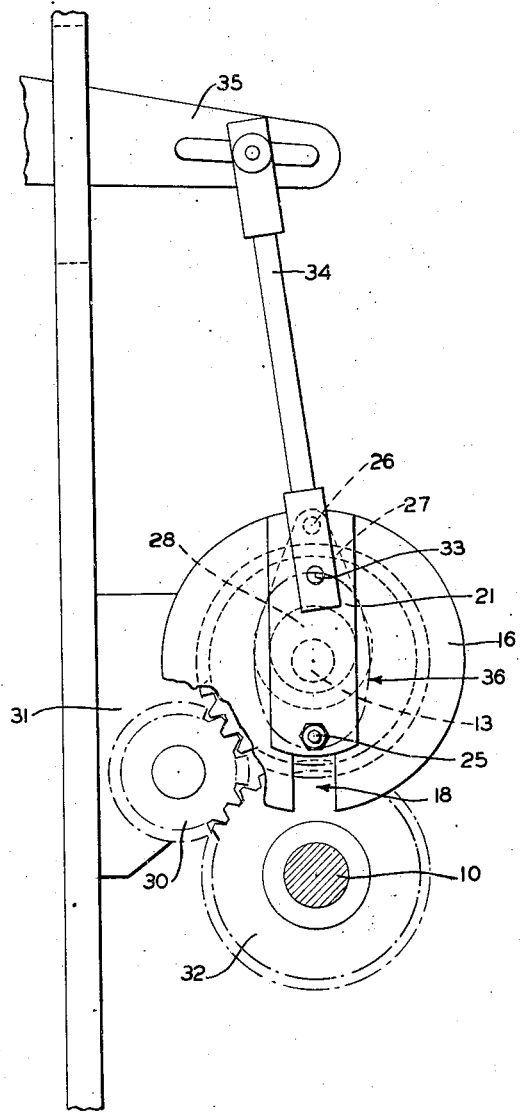
Figure 2 is a left hand view of an end elevation of Fig. 1.
Figure 3:
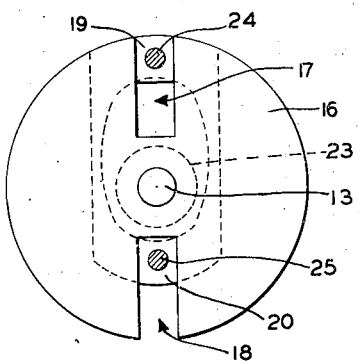
Figure 3 is a left hand view of an end elevation of Fig. 1 and shows the crank disc with the strap removed.

A pin 33 projecting from the strap 21 is connected with a rod 34 which, in turn, is connected with one arm of a rocking arm 35, Figure 2, to operate the oscillatory member described in U. S. application S. N. 700,711.

In operation, with the various parts suitably set, the crank disc 16 and the eccentric 28 rotate with equal angular velocities but in opposite directions. The slide blocks 19 and 20 and the members 21 and 22 are thus moved radially relatively to the crank disc and in each cycle the pin 33 traces out the path indicated in chain lines at 36, Figure 2. When the mechanism is so set, the pin 33 and the extension pin 26 are simultaneously at top dead centre and when each has been moved through 180 degrees they are simultaneously at bottom dead centre. In passing between these two points, however, the eccentric so controls the movement of the pin 33 that it moves through a relatively straight path and as it is during this period that the oscillatory member is operated, such member has a relatively constant velocity during its operation.

Although only one application of the mechanism described above has been given, it will be appreciated that the mechanism can be used for a variety of purposes, and that by varying the throw of the eccentric considerable variations of the path of travel of the pin 33 can be obtained.

In one illustration of the alternative application of the mechanism according to the present invention, the mechanism may be employed to operate the paper feeding mechanism of a tabulating or like statistical machine. For example, the driving mechanism according to the invention may be substituted for the crank disc driving mechanism of the paper feeding device shown in British Patent Specification No. 491,866.

As another illustration of the application of the mechanism according to the invention, the mechanism may be used to operate the restoring bar for the settable type and rack bars of a statistical machine of the kind described in British Patent Specification No. 522,512.

I claim:

1. Mechanism for driving an oscillatory member, comprising a rotatable driven shaft, a driving member mounted on the shaft for rotation therewith, a slide carried by the driving member for radial movement relative thereto, an eccentric element co-axial with the rotatable shaft and operatively connected with said slide, means to rotate said rotatable shaft and eccentric element in opposite directions at equal angular velocities, and means to connect the slide with the oscillatory member.

2. Mechanism for driving an oscillatory member, comprising in combination a rotatable driving shaft, a driven shaft rotated by the driving shaft at an equal angular velocity, a crank disc secured to the driven shaft for rotation therewith, two sliding elements slidably mounted in diametrically opposite slots in said crank disc, a connecting element connecting the sliding elements and movable therewith, an eccentric element co-axial with said driven shaft, a connecting rod operatively connecting the eccentric element with said sliding elements, gearing driven from the driving shaft to rotate said eccentric element in a direction opposite that of the driving shaft but at the same angular velocity, and means to connect said connecting element with a member to be oscillated.

3. Mechanism for driving an oscillatory member, comprising a shaft, a rotatable driving member mounted on said shaft, a slide carried by the driving member for radial movement relative thereto, an eccentric element co-axial with said shaft and operatively connected with said slide, means to rotate said driving member and said eccentric elements in opposite directions at equal angular velocities, and means to connect said slide with the oscillatory member.

ARTHUR THOMAS.

REFERENCES CITED

The following references are of record in the file of this patent:

UNITED STATES PATENTS

| Number | Name | Date |
|--------|------|------|
| 766,878 | Foster | Aug. 9, 1904 |